Oct. 27, 1964    J. H. BARNHILL    3,154,238
REINFORCED BAG
Filed Dec. 26, 1961

INVENTOR
JAMES HATHEN BARNHILL
BY Robert W. Black
ATTORNEY

United States Patent Office 3,154,238
Patented Oct. 27, 1964

3,154,238
REINFORCED BAG
James H. Barnhill, Plainfield, N.J., assignor to E. I. du Pont de Nemours and Company, Wilmington, Del., a corporation of Delaware
Filed Dec. 26, 1961, Ser. No. 162,245
3 Claims. (Cl. 229—55)

This invention relates to reinforced transparent bags and more particularly to regenerated cellulose film bags reinforced with a polyethylene terephthalate film strip.

The packaging of nut meats and other commodities in bags of transparent, heat-sealable, moistureproof regenerated cellulose film is well known. In order to attract the attention of shoppers, it is desirable to hang the filled bags on display rack pegs by means of a hole punched through the center of the top seal. However, bags containing six ounces or more tend to gradually pull through the hole and fall from the rack, or the hole is pulled through by careless hanging and handling of the bags.

One method which has been employed to overcome the above-mentioned difficulty has been the use of a 0.005 inch thick paper saddle or header label sealed over the top seal of the bag. The rack hole is thus reinforced by the single or double thickness of the label. However, the application of a saddle or header label involves the extra cost of the label and an extra operation in the packaging process, thus resulting in a decided increase in the cost of the finished package.

It is an object of this invention to provide reinforced transparent bags. It is a further object of this invention to provide regenerated cellulose film bags reinforced with a polyethylene terephthalate film strip. A still further object of this invention is to provide a regenerated cellulose film bag reinforced with a strip of polyethylene terephthalate film to give added strength in the longitudinal direction of the bag and to overcome the hole-tearing weakness of the bag. These and other objects will appear hereinafter.

These and other objects of this invention are accomplished by a bag comprising a transparent tubular body having an overlapped, longitudinal center seal, a longitudinally extending transparent strip having a heat-sealable surface compatible with said bag centered underneath and in line with said center seal, the end portions of said strip sealed between the sides of said bag at the top and bottom seals which comprises zones extending transversely across the entire body, the top seal of said bag having a rack hole extending through said center seal and said strip.

Figure 1:
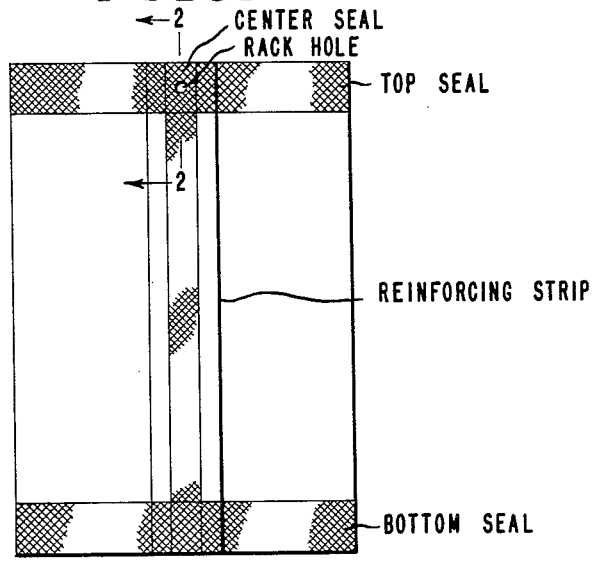
Figure 2:
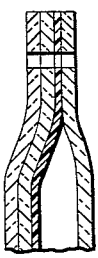
Figure 3:
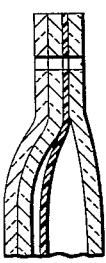

The invention will become apparent as the same is more fully understood from the accompanying drawings, which disclose preferred embodiments of the invention wherein:

FIGURE 1 is a front elevational view of a reinforced tubular bag provided in accordance with the principles of the present invention;

FIGURE 2 is an enlarged fragmentary sectional view taken through the top seal along the line 2—2 of FIGURE 1 showing the reinforcing strip heat sealed to the longitudinal center seal; and FIGURE 3 is an enlarged fragmentary sectional view taken through the top seal along the line 2—2 of FIGURE 1 showing a gap between the reinforcing strip and longitudinal center seal to indicate that the strip is not heat sealed to the center seal.

According to the present invention, the hole-tearing weakness of regenerated cellulose film bags is overcome by using a reinforcing strip of material, such as polyethylene terephthalate film, in the area through which the rack hole is to be punched. In a standard make-fill machine such as the Hayssen Manufacturing Company's "Compak" machine or Stokes-Wrap machine manufactured by the Food Machinery and Chemical Corporation, the reinforcing strip is easily fed in on top of the regenerated cellulose film, properly centered, and automatically sealed to the bag as the bottom and top seals are made. The reinforcing strip can be fed in on either the face side or the longitudinal seal side of the bag and is under constant control during the filling and sealing operations. A hole punch is incorporated in the crimp-seal jaws so as to punch a hole in the center of the intersection of the top seal and the longitudinal seam and thereby through the center of the reinforcing strip, simultaneously with the sealing operation.

A reinforcing strip can also be added to pre-made bags such as are manufactured on a Simplex pre-made bag machine manufactured by the Food Machinery and Chemical Corporation. In contrast to the standard make-fill machines which turn out completely filled and sealed bags, pre-made bags have only the bottom and longitudinal seals made up and are subsequently filled and closed (top sealed) at a different location and time.

The reinforcing strip must be compatible with the bag material in order to be heat-sealed in place. For example, as illustrated in Example I which follows, the reinforcing strip must be polymer-coated when used with a polymer-coated bag. A polyethylene strip can be used with polyethylene bags. A polypropylene strip can be used with polypropylene bags. The regenerated cellulose film bag can be coated with a polyolefin and the reinforcing strip coated with a polyolefin, or the strip can be 100 percent polyolefin, etc. An extra strip of regenerated cellulose film having a polymer coating can be used to reinforce a polymer-coated bag. A reinforcing strip having a nitrocellulose composition coating can be used to reinforce nitrocellulose composition coated bags, or a strip or nitrocellulose film can be used to reinforce a nitrocellulose composition coated bags, etc. Generally, any thermoplastic bag and reinforcing strip can be used as long as they are compatible with one another when heat-sealed. Preferably, the strip material should have a higher tear strength than the bag material.

In addition to heat-sealing a reinforcing strip in place, the reinforcing strip can also be sealed in place with an adhesive, thus permitting many combinations of strip material and bag material.

It is usually desirable to use an anchoring resin for anchoring coatings on regenerated cellulose film. These resins are usually water-soluble, partially condensed thermosetting resins, such as the partially condensed water-soluble phenol-aldehyde and urea aldehyde resins disclosed in Charch and Bateman (U.S. Patent 2,159,007), the guanidine-urea-formaldehyde resins of Chapman (U.S. Patent 2,533,557), the melamine-formaldehyde resins of Pitzl (U.S. Patent 2,432,542), the amine-modified urea-formaldehyde resins of Wooding (U.S. Patent 2,546,575), the resins of Wooding (U.S. Patent 2,688,570), of Wooding et al. (U.S. Patent 2,646,368), of Wooding (U.S. Patent 2,796,362), of Rosser (U.S. Patent 2,699,406), etc.

The invention can be further understood by referring to the following examples:

EXAMPLE I

Regenerated cellulose film approximately 0.0012 inch thick (when dry) was prepared with a guanidine-urea-formaldehyde anchoring resin as taught in U.S. Patent 2,533,557 to Chapman. The film was then coated with an aqueous dispersion of a heat-sealable, moistureproof vinylidene chloride copolymer composition, comprising vinylidene chloride, methyl acrylate and itaconic acid in the ratio of 94/6/2, at the rate of approximately 6 grams of dry coating solids per square meter of film (3 grams on each side), as described in U.S. Patent 2,570,478 to Pitzl.

Bags were made from this 0.0012 inch thick regenerated cellulose film on a standard Stokes-Wrap form-and-fill machine but no reinforcing strip was used. Each bag was filled with one pound of peanuts. A ¼ inch hole was punched through the center portion of the top seal where the overlap from the longitudinal seal occurred. The units were hung on 3/16 inch brass rods and observed for one week or until failure occurred.

Polyethylene terephthalate film 0.0005 inch thick was prepared with a subcoating and a top-coating as described in U.S. Patent 2,824,025 to McIntyre, Jr. The subcoating contained a copolymer of 80 percent 2-ethylhexyl acrylate, 20 percent acrylonitrile and 1 percent, based on the total weight of the previous components, of itaconic acid. The top-coating contained a copolymer of 94 percent vinylidene chloride, 6 percent methyl acrylate and 2 percent, based on the total weight of the previous two components, of itaconic acid.

A slit roll of the heat-sealable, moistureproof coated regenerated cellulose film as prepared above was then fed into a standard Stokes-Wrap form-and-fill machine where it was converted into bags which were automatically filled with one pound of peanuts. Simultaneously, a strip of polyethylene terephthalate film, 1½ inches wide, made as described above, was fed into the form-and-fill machine along with the coated regenerated cellulose film opposite the overlapped, longitudinal center seal. This strip was fed into the machine. This resulted in a bag with the polyethylene terephthalate strip lengthwise inside the bag, sealed at the top and bottom seals, along the face of the bag. As the bag was loaded with nuts, the strip was automatically pressed against the bag wall, causing no detraction from the appearance of the package.

A ¼ inch diameter punch was incorporated in the crimp-seal jaws so as to punch a hole in the center of the intersection of the top seal and the longitudinal seal. It was found necessary to widen the heat-sealing jaws of the machine approximately ¼ inch to accommodate the punch. It was also found necessary to have at least ½ inch of seal area below the punch hole to prevent opening of the bag due to its weight.

Bags made as described above give excellent results when given the tensile and shock tests and when hung on a display rack. Comparative results are given in Tables I and II.

*Table I*

| Time Hanging | Not Reinforced | Reinforced |
| --- | --- | --- |
| 0 to 2 hours | 8 failures [1] | 2 failures. |
| 18 hours | 0 failures | 1 failure. |
| 26 hours | 2 failures | 0 failures. |
| 42 hours | 2 failures | 0 failures. |
| 90 hours | 9 failures | 0 failures. |
| 1 week | 0 left hanging | 12 left hanging. |

[1] Failure=dropped off rod.

More of these same bags were then tested on an Instron Tensile Tester to determine how much force is necessary to initiate a tear in the ¼ inch hole in the seals. The results are given in Table II.

*Table II*

FORCE (IN POUNDS) REQUIRED TO INITIATE A TEAR IN IN SEALS WITH ¼ INCH HOLE

| Bag No. | Not Reinforced | Reinforced |
| --- | --- | --- |
| 1 | 2.50 | 5.20 |
| 2 | 1.80 | 5.40 |
| 3 | 2.20 | 6.80 |
| 4 | 3.90 | 5.70 |
| 5 | 3.05 | 5.65 |
| 6 | 2.85 | 4.90 |
| 7 | 2.40 | 4.20 |
| 8 | 2.80 | 5.70 |
| 9 | 2.55 | 5.30 |
| 10 | 3.00 | 4.65 |
| Average | 2.7 | 5.4 |

From the foregoing tables it is easily seen that the reinforced bags were far superior to the non-reinforced bags.

EXAMPLE II

Bags were made up as in Example I except that a 0.00075 inch thick polyethylene terephthalate reinforcing strip was used and a 5/16 inch hole was punched through the center portion of the top seal where the overlap from the longitudinal seal occurred.

When compared with unreinforced bags in the rack hanging test, none of the bags reinforced with the 0.00075 inch thick polyethylene terephthalate strip failed in a week's test; whereas all of the unreinforced ones had failed.

EXAMPLE III

Regenerated cellulose film approximately 0.0012 inch thick was prepared and coated with a vinylidene chloride arcylonitrile copoylmer composition at the rate of approximately 5 grams of dry solids per square meter (2.5 grams on each side), as described in Example I in U.S. Patent 2,977,246 to Fisher and Johnstone.

Polyethylene terephthalate film 0.001 inch thick was prepared as described in U.S. Patent 2,823,421 to Scarlett and coated at the same rate and with the same composition as was the regenerated cellulose film of this example.

Bags of the above regenerated cellulose film made on a standard form-and-fill machine and reinforced with a 1 inch wide strip of the above polyethylene terephthalate film gave excellent results when tested as in Example I.

EXAMPLE IV

Regenerated cellulose film approximately 0.0018 inch thick and polyethylene terephthalate films 0.0005 inch, 0.00075 inch, and 0.0015 inch thick were made as described in Example I.

Bags, reinforced with a 1 inch strip of each of the above polyethylene terephthalate films, were made on a form-and-fill machine with ¼ inch holes punched in the center of the intersection of the top seal and the longitudinal seal.

In the tensile test, some of the bags were hung on a hook and pulled at a rate of ½ inch per minute on an Instron Tensile Tester, noting the force required for hole failure. From the results obtained, listed in Table III, it is seen that a 0.0005 inch reinforcing strip gives a stronger hole than when the bag is unreinforced, and a 0.00075 inch strip gives better results than a 1-side header label or a 2-side saddle label. A 0.00015 inch strip gives outstanding results.

*Table III*

Hole broke at, lbs.
| | |
| --- | --- |
| Unreinforced bag | 3.6 |
| Reinforced bag, 0.0005 inch strip | 4.9 |
| Header label, single thickness | 5.4 |
| Saddle label, double thickness | 5.7 |
| Reinforced bag, 0.00075 inch strip | 6.3 |
| Reinforced bag, 0.0015 inch strip | 8.0 |

To more closely simulate the abuse received in a store, a "shock" cycling test was devised. The test equipment consisted of a rotating arm with an attached block free to slide back and forth as the arm rotated at about 25 r.p.m. The bag was hung freely on a ¼ inch peg protruding horizontally from this sliding block with an 8 oz. weight attached to the bottom of the bag. At each revolution of the arm, the block would fall approximately 3 inches coming to an abrupt stop, creating a substantial shock force on the hole. The number of cycles until hole failure were noted.

Comparative results, listed in Table IV, shows results similar to those shown in Table III.

Table IV

Shock Test
(Average No. of Cycles)

| | |
|---|---|
| Unreinforced bag | 7 |
| Reinforced bag, 0.0005 inch strip | 19 |
| Header label, single thickness | 26 |
| Saddle label, double thickness | 36 |
| Reinforced bag, 0.00075 inch strip | 68 |
| Reinforced bag, 0.0015 inch strip | 201 |

This invention makes it possible to make reinforced pre-made or make-fill bags of transparent, heat-sealable, moistureproof regenerated cellulose film containing more than 6 ounces of nut meats, peanuts, etc., which can be hung from display racks through a hole punched in the center of the top seal of the bag and which will not pull through the hole.

What is claimed is:

1. A reinforced bag comprising a transparent tubular body having an overlapped, longitudinal center seal, a narrow longitudinally extending flexible transparent strip having a heat-sealable surface compatible with said bag centered underneath and in line with said center seal and having a width approximately the width of said center seal, the end portions of said strip heat sealed between the sides of said bag at the top and bottom seals which comprises zones extending transversely across the entire body, the top seal of said bag having a rack hole extending through said center seal and said strip.

2. A longitudinally reinforced transparent bag comprising a vinylidene chloride copolymer coated regenerated cellulose tubular body having an overlapped, longitudinal center seal, a narrow longitudinally extending flexible vinylidene chloride copolymer coated polyethylene terephthalate strip centered underneath and in line with said center seal and having a width approximately the width of said center seal, the end portions of said strip heat sealed between the sides of said bag at the top and bottom seals which comprise zones extending transversely across the entire body, the top seal of said bag having a rack hole extending through said center seal and said strip.

3. The reinforced transparent bag of claim 2 wherein the reinforcing strip is heat sealed to the longitudinal center seal.

References Cited in the file of this patent

UNITED STATES PATENTS

| | | |
|---|---|---|
| 2,257,823 | Stokes | Oct. 7, 1941 |
| 2,788,121 | Ayres | Apr. 9, 1957 |
| 2,912,805 | Maynard | Nov. 17, 1959 |
| 2,923,646 | Jordan | Feb. 2, 1960 |
| 2,977,246 | Fisher et al. | Mar. 28, 1961 |
| 3,011,690 | Gabuzda | Dec. 5, 1961 |
| 3,024,962 | Meister | Mar. 13, 1962 |

FOREIGN PATENTS

| | | |
|---|---|---|
| 701,286 | Great Britain | Dec. 23, 1953 |